United States Patent

Trovati

[15] 3,664,401
[45] May 23, 1972

[54] METHOD FOR THE MANUFACTURE OF INFLATED ARTICLES

[72] Inventor: Louis Trovati, Lyon, France
[73] Assignee: Dodelino S.A.
[22] Filed: Oct. 24, 1969
[21] Appl. No.: 869,318

[52] U.S. Cl. ............................156/145, 156/290, 156/292, 244/31
[51] Int. Cl. ............................................B32b 31/06
[58] Field of Search..........156/145, 243, 290, 292, 146–147, 156/229; 244/31

[56] References Cited

UNITED STATES PATENTS

| | | | |
|---|---|---|---|
| 2,858,090 | 10/1958 | Winzen et al. | 156/145 |
| 2,935,320 | 5/1960 | Chupa | 156/145 |
| 3,109,611 | 11/1963 | Yost | 244/31 |
| 3,346,441 | 10/1967 | Bird | 156/290 |

*Primary Examiner*—Carl D. Quarforth
*Assistant Examiner*—S. R. Hellman
*Attorney*—Waters, Roditi, Schwartz & Nissen

[57] ABSTRACT

A method of manufacturing inflated articles of plastics materials, of which the shapes and volumes are obtained by controlled over-extension of the plastics films, consists in fabricating a central section of the article by a film or a sheet of substantially unelastic plastics material, having a coefficient of extensibility as low as possible. The periphery is made to correspond to the profile of the desired section, this film being sandwiched between two films of plastics material of the same shape, to whose edges it is bonded by welding. At least, one film comprises an inflating valve. The article is inflated to a definite pressure by the desired deformation of the outer films as a function of their nature and their thickness, the balancing of the inflating pressures, on each side of the central film being ensured by a communicating orifice arranged at the center of the central film. Preferably, the orifice arranged at the center of the central film has a profile geometrically similar to that of the section of the fabricated article through the said central film, e.g. circular. The cutting out and welding of the films may be effected in a single operation. The plastics material may be polyvinyl chloride.

5 Claims, 3 Drawing Figures

PATENTED MAY 23 1972  3,664,401

METHOD FOR THE MANUFACTURE OF INFLATED ARTICLES

The present invention relates to a method for the manufacture of inflated articles.

The manufacture of spherical inflated articles, ovoid or of any other shape is done either from elastic films largely deformable, or from an assembly of previously cut-out and welded films and of which each has, for example, a melon-slice contour.

In the first case, the articles obtained generally named gold-beaters skin, are of great fragility and of short life since they become very rapidly porous.

In the second case, the long and delicate assembly of the article considerably increases its cost price. In addition, the number of weld lines increases the leakage risk.

It is an object of the present invention to overcome these drawbacks.

It is accordingly a further object to provide a process of manufacturing inflated articles of plastics material of which the shape and the volume are obtained by controlled over-extension of films of plastics material.

According to the invention there is provided a method consisting, on one hand, in materializing one or several sections of the article by a film or a sheet of plastics or other material, not substantially elastic, having a coefficient of extensibility as low as possible, and of which the periphery corresponds to the profile of the desired section, this film being placed in a sandwich between two films or sheets of plastics or other similar material and of the same profile, to the edges of which it is bonded by welding and of which one at least comprises an inflating valve and, on the other hand, in inflating the article to a definite pressure, as a function of their nature and of their thickness, by the desired deformation of the outer films, the balancing of the inflation pressures on each side of the central film, being ensured by a communication orifice arranged at the center of the said central film.

This inflation enables the obtaining by stretching, of the desired deformation of the outer films, so that the user will be able, by inflation under low pressure, such as by mouth, to obtain this same deformation.

Preferably, the orifice arranged at the center of the central film has a profile geometrically similar to that of the article fabricated through the said central film.

In the case where the inflated article has to be spherical, the three films or sheets welded between themselves by their peripheral edge are circular and the central film comprises at its center a circular orifice.

In any case, the invention will be well understood, with the aid of the description which follows, with reference to the accompanying diagrammatic drawing, showing, purely by way of illustrative and non-limiting example, one embodiment of practising the method according to the invention to obtain a spherical balloon.

IN THE DRAWING

Figure 1:
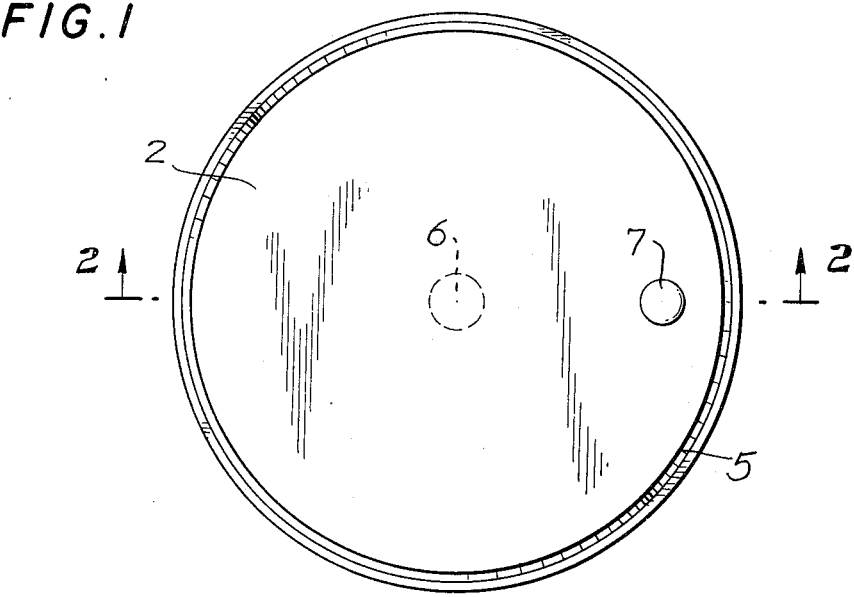
FIG. 1 shows a plan view of a balloon in deflated state.

The method of manufacture of the balloon shown in the drawing consists, in the course of a first phase, in superimposing three films or sheets 2, 3 and 4 of circular profile, of plastics material not substantially elastic, then of welding these three films 2, 3 and 4 by their peripheral edge, by effecting a circular weld line 5.

Advantageously, the circular cutting out and the welding of the film 2, 3, 4 are effected in a single operation, by means of welding and cutting electrodes, of circular shape.

Figure 2:
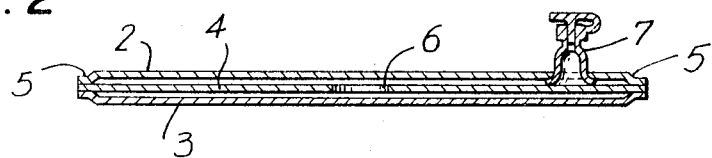
FIG. 2 shows a view in diametrical cross-section, along the line 2—2 of FIG. 1.
Figure 3:
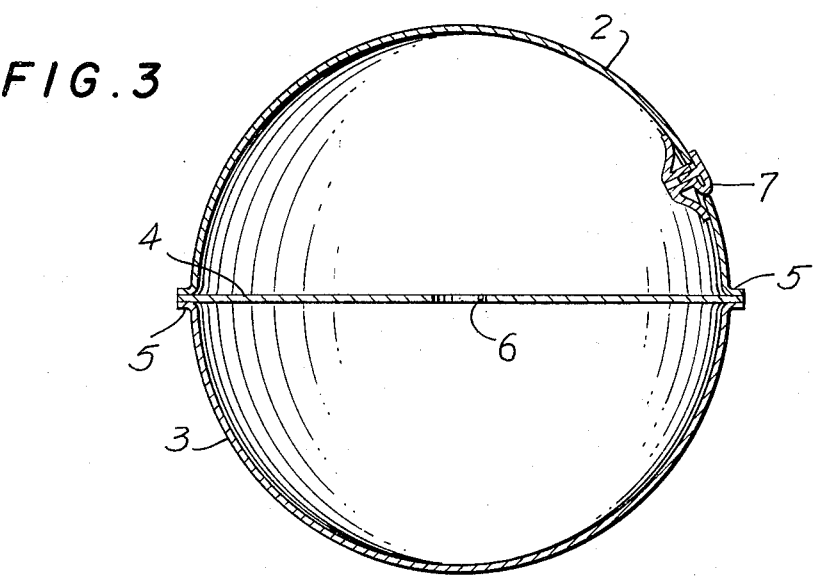
FIG. 3 is a view in diametrical cross-section, similar to that of FIG. 2, in the inflated condition.

As is shown, particularly, in FIGS. 2 and 3, the central film 4 includes, at its center, a circular orifice 6 and one of the two outer films, namely the film 2 in this example, includes a valve 7 of conventional type enabling the inflation of this balloon.

The second and third phase of this method consists in inflating this balloon under relatively high pressure. In fact, it must bring the outer films 2 and 3 to the shape of a hemispherical dome by deforming them by extension. The inflation pressure depends hence on the nature and the thickness of the films 2 and 3.

The orifice 6 of the central film 4 enables not only the inflation of the balloon with a single valve 7, but also the balancing of the pressures on each side of the central film 4. This balancing is, in fact, necessary so that this film 4 can play its role of maintaining the weld line 5 along a circular profile.

It is for the same purpose that the orifice 6 is arranged at the center of the film 4.

In fact, if the central film 4 is deformed by reason of its strictly symmetrical constitution and of the regular distribution of the radial forces to which it is subjected, this deformation is regular and can only produce an increase of its diameter without loss of its circular shape.

Given that, as previously indicated, the films 2 and 3 are of non-elastic or slightly elastic plastics material, their deformation which results from inflation at relatively high pressure, is practically permanent, so that the user will be able, as a result to obtain the same inflation, at a much lower pressure, such as by inflation by mouth.

This method hence enables the production at little cost and with a pressure of use comparable to that of "gold-beaters skin" balloons, of a balloon distinctly more robust than these latter and much more durable.

A perfectly suitable material for the production of this balloon is polyvinyl chloride.

As goes without saying, the invention is in no way limited to the single embodiment of the practice of the method which has been described above by way of non-limiting example; it embraces on the contrary, all variations of realization, whatever may be particularly the shape of the article inflated.

I claim:

1. A method of manufacturing inflated articles of essentially non-elastic plastics materials, comprising; forming a first centrally apertured sheet member of said plastics material, said sheet member having a peripheral configuration corresponding to the profile of the article section; interposing said sheet member between two outer sheets of similar plastics material, said outer sheets having peripheral dimensions in conformance with that of said first sheet member, bonding said outer sheets and said sheet member about their peripheral edges so as to form a fluid-tight sealed construction; positioning an inflating valve in at least one of said outer sheets; and imparting a pressurized inflating medium to the interior of said article so as to expand the outer sheets to a predetermined inflated shape and article volume, said pressurized medium being adapted to flow through the central aperture in said first sheet member so as to assure the balanced inflation of both of said outer sheets.

2. A method as claimed in claim 1, wherein said central aperture in said first sheet member is formed so as to geometrically conform to the configuration of said article along a sectional plane coextensive with said sheet member.

3. A method as claimed in claim 1, wherein said bonded first sheet member and said outer sheets are formed to define a circular peripheral configuration, and the central aperture in said first sheet member is essentially circular.

4. A method as claimed in claim 1, wherein the peripheral dimensioning of said superimposed first sheet member and outer sheets, and the bonding thereof, is effected in a simultaneous operative step.

5. A method as claimed in claim 1, wherein said first sheet member and said outer sheets are constituted essentially of polyvinyl chloride.

* * * * *